(12) United States Patent
Ohori et al.

(10) Patent No.: US 11,120,386 B2
(45) Date of Patent: Sep. 14, 2021

(54) COMPUTER-READABLE RECORDING MEDIUM, SIMULATION METHOD, AND SIMULATION APPARATUS

(71) Applicant: FUJITSU LIMITED, Kawasaki (JP)

(72) Inventors: Kotaro Ohori, Sumida (JP); Shohei Yamane, Kawasaki (JP); Hiroaki Yamada, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 268 days.

(21) Appl. No.: 16/246,590

(22) Filed: Jan. 14, 2019

(65) Prior Publication Data
US 2019/0228354 A1  Jul. 25, 2019

(30) Foreign Application Priority Data

Jan. 19, 2018  (JP) .............................. JP2018-007274

(51) Int. Cl.
G06Q 10/06 (2012.01)
G06Q 10/04 (2012.01)
G06Q 30/02 (2012.01)

(52) U.S. Cl.
CPC ......... *G06Q 10/067* (2013.01); *G06Q 10/047* (2013.01); *G06Q 10/063* (2013.01); *G06Q 10/0637* (2013.01); *G06Q 30/02* (2013.01)

(58) Field of Classification Search
CPC .. G06Q 10/067; G06Q 10/047; G06Q 10/063; G06Q 10/0637; G06Q 30/02
See application file for complete search history.

(56) References Cited

U.S. PATENT DOCUMENTS

| 6,741,973 | B1* | 5/2004 | Dove ..................... G06N 3/126 706/13 |
| 7,685,023 | B1* | 3/2010 | Abraham ........... G06Q 30/0643 705/27.2 |
| 8,930,134 | B2* | 1/2015 | Gu ....................... G01C 21/206 701/434 |
| 10,163,269 | B2* | 12/2018 | Hiranandani ......... G06Q 10/00 |
| 10,339,592 | B2* | 7/2019 | Crow ................. G06Q 30/0643 |

(Continued)

FOREIGN PATENT DOCUMENTS

| JP | 06-309295 | 11/1994 |
| JP | 2016-66234 | 4/2016 |
| WO | 2015/059807 | 4/2015 |

*Primary Examiner* — Philip J Chea
*Assistant Examiner* — Hassan A Khan
(74) *Attorney, Agent, or Firm* — Fujitsu Patent Center

(57) ABSTRACT

A non-transitory computer-readable recording medium has stored therein a program that causes a computer to execute a process including: inputting, to each of a plurality of agents, a plurality of purchasing behavioral objectives, a first purchasing behavioral objective, and facilities information indicating a plurality of facilities corresponding to the plurality of purchasing behavioral objectives; and causing each of the plurality of agents to determine, based on a condition that has been set in accordance with a facility search behavior with respect to a facility that is selected from the plurality of facilities in response to the purchasing behavioral objective of each of the plurality of agents at a time of execution of simulation, a second purchasing behavioral objective of each of the plurality of agents from among the plurality of purchasing behavioral objectives.

12 Claims, 15 Drawing Sheets

(56) References Cited

U.S. PATENT DOCUMENTS

| | | | | |
|---|---|---|---|---|
| 2003/0053659 | A1* | 3/2003 | Pavlidis | G06K 9/38 |
| | | | | 382/103 |
| 2006/0179014 | A1* | 8/2006 | Yoshida | G06Q 30/0204 |
| | | | | 706/12 |
| 2006/0200378 | A1* | 9/2006 | Sorensen | G06Q 30/0203 |
| | | | | 705/7.29 |
| 2008/0159634 | A1* | 7/2008 | Sharma | G06K 9/00771 |
| | | | | 382/224 |
| 2009/0240571 | A1* | 9/2009 | Bonner | G06Q 30/0603 |
| | | | | 705/27.1 |
| 2009/0306946 | A1* | 12/2009 | Badler | G06T 13/40 |
| | | | | 703/2 |
| 2012/0223943 | A1* | 9/2012 | Williams | G06Q 30/06 |
| | | | | 345/419 |
| 2013/0317950 | A1* | 11/2013 | Abraham | G06Q 30/06 |
| | | | | 705/27.1 |
| 2015/0310447 | A1* | 10/2015 | Shaw | G06Q 30/0201 |
| | | | | 705/304 |
| 2016/0005052 | A1* | 1/2016 | Sato | G06Q 30/0201 |
| | | | | 705/7.29 |
| 2017/0109762 | A1* | 4/2017 | Kim | G06Q 30/0201 |

* cited by examiner

FIG.3

| SIGN NUMBER | LOCATION | TRANS-FER LEVEL | DISTANCE | ANGLE | VISIBILITY DURATION | AREA INFORMA-TION | FACILITY INFORMA-TION | GUIDANCE INFORMA-TION | DIFFICULTY LEVEL OF MEMORY |
|---|---|---|---|---|---|---|---|---|---|
| 1 | (20, 20, 1) | A | 10 | 2/3π | 3 | restaurant | - | [2] | 1.0 |
| 2 | (20, 20, 1) | C | 4 | 2/3π | 15 | exchange | 4, 8, 22, 25 | [44, 46, 48] | 0.5 |
| .. | .. | .. | .. | .. | .. | .. | .. | .. | .. |
| 20 | (250, 80, 2) | C | 4 | 2/3π | 15 | shop | 3, 5, 11, 14, 18 | [88, 92, 96] | 0.5 |

| OCCURRENCE PROBABILITY OF PEDESTRIAN |
|---|
| 0.8 |

13

| PEDES-TRIAN TYPE | OCCUR-RENCE RATE | RANGE OF VISIBILITY | VIEWING ANGLE | STORAGE TIME | RECALL CATEGORY SET | ATTRAC-TIVENESS (FACILITY 1) | ... | ATTRAC-TIVENESS (FACILITY 30) |
|---|---|---|---|---|---|---|---|---|
| 1 | 0.1 | 10 | 2/3π | 10 | 1, 3, 6, 8 | 1.00 | ... | 2.12 |
| 2 | 0.1 | 10 | 2/3π | 12 | 2, 3, 6, 7 | 3.14 | ... | 2.33 |
| ... | ... | ... | ... | ... | ... | ... | ... | ... |
| 10 | 0.1 | 10 | 2/3π | 9 | 1, 3, 4, 5 | 4.11 | ... | 0 |

COMPUTER-READABLE RECORDING MEDIUM, SIMULATION METHOD, AND SIMULATION APPARATUS

CROSS-REFERENCE TO RELATED APPLICATION

This application is based upon and claims the benefit of priority of the prior Japanese Patent Application No. 2018-007274, filed on Jan. 19, 2018, the entire contents of which are incorporated herein by reference.

FIELD

The embodiment discussed herein is related to a computer-readable recording medium, a simulation method, and a simulation apparatus.

BACKGROUND

Conventionally, at shopping malls, airports, and the like, a people flow simulation is actively used to examine a sign system plan related to arrangement of indication marks (signs) that provide various kinds of guidance, guides, and the like (hereinafter, collectively referred to as signs).

In the people flow simulation, in a virtual space corresponding to shopping malls, airports, and the like, signs that are in accordance with the sign system plan and pedestrian agents that are replicas of pedestrians are arranged. Then, by simulating behaviors of the pedestrian agents based on information acquired (recognized) by the signs arranged in the virtual space, the flow of the pedestrians in the sign system plan is modeled.

In this people flow simulation, there is a known active search behavior simulation system for autonomous agents corresponding to active persons in consideration of their character of having a tendency to avoid a path in which someone once passed.

Patent Document 1: Japanese Laid-open Patent Publication No. 2016-66234
Patent Document 2: International Publication Pamphlet No. WO 2015/059807
Patent Document 3: Japanese Laid-open Patent Publication No. 6-309295

SUMMARY

According to an aspect of an embodiment, a non-transitory computer-readable recording medium has stored therein a program that causes a computer to execute a process of simulating purchasing behaviors of persons by using a plurality of agents, the process including: inputting, to each of the plurality of agents, a plurality of purchasing behavioral objectives, a first purchasing behavioral objective, and facilities information indicating a plurality of facilities corresponding to the plurality of purchasing behavioral objectives; and causing each of the plurality of agents to determine, based on a condition that has been set in accordance with a facility search behavior with respect to a facility that is selected from the plurality of facilities in response to the purchasing behavioral objective of each of the plurality of agents at a time of execution of simulation, a second purchasing behavioral objective of each of the plurality of agents from among the plurality of purchasing behavioral objectives, the second purchasing behavioral objective being a purchasing behavioral objective to be changed from the first purchasing behavioral objective.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating a sign system plan;
FIG. 4 is a diagram illustrating pedestrian information.

DESCRIPTION OF EMBODIMENTS

Figure 1:
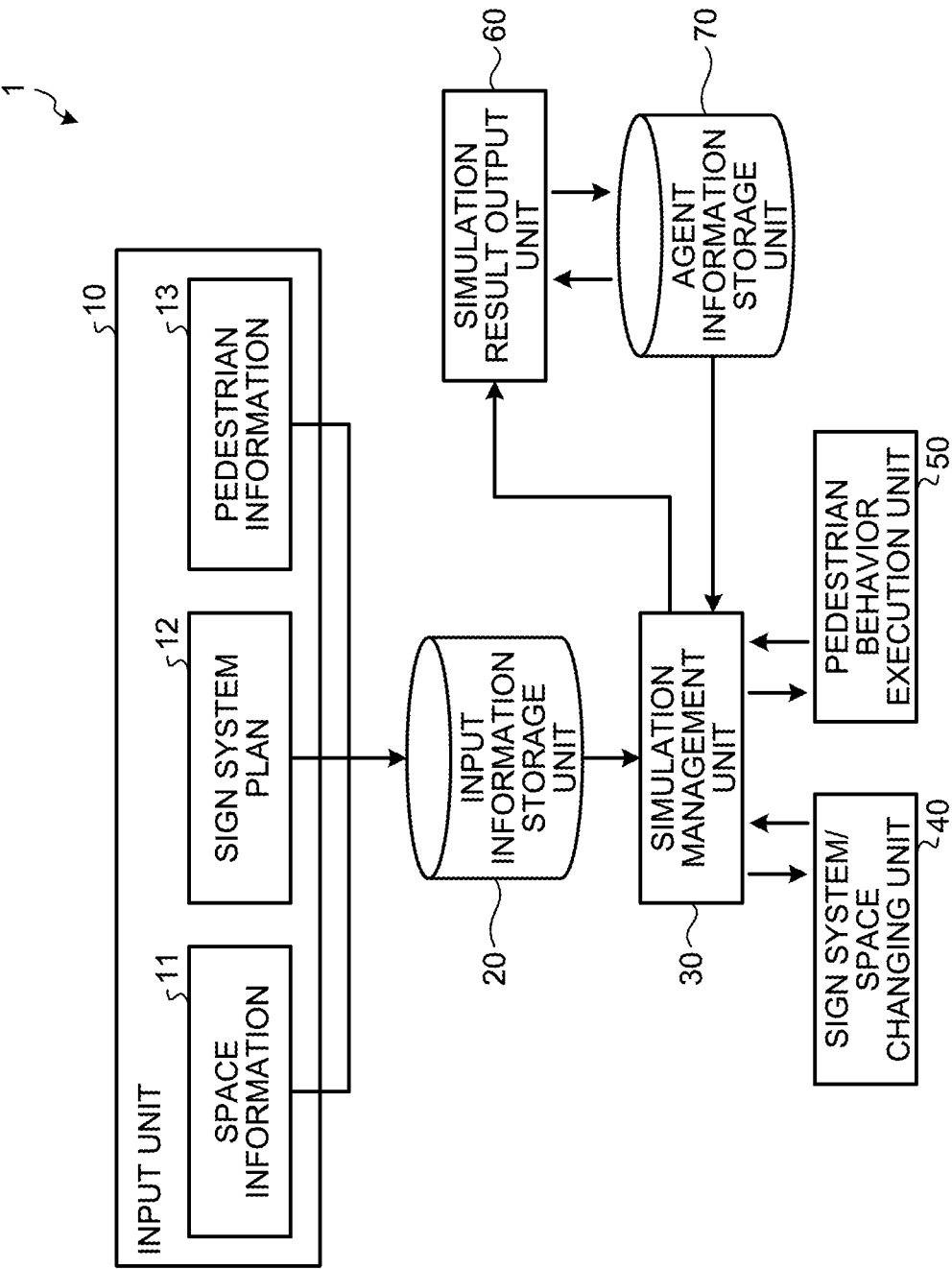
FIG. 1 is a block diagram illustrating an example of a configuration of a simulation apparatus according to an embodiment.

In the conventional technology described above, like path selection with respect to behavioral objectives, the result indicating that each of the agents reaches mainly needs to be matched with the target and the process of the behavior of each agent is not regarded as important. Thus, it is difficult to reproduce more humane behaviors such as a behavior in which a behavioral objective is changed during the behavior. In one aspect, it is an object of the embodiments to perform a people flow simulation with high accuracy including the behavioral process of the pedestrian agent.

Preferred embodiments of the present invention will be explained with reference to accompanying drawings. In the embodiment, components having the same function are assigned the same reference numerals and descriptions of overlapped portions will be omitted. Furthermore, the simulation program, the simulation method, and the simulation apparatus described in the embodiment below are only examples and do not limit the embodiment. Furthermore, each of the embodiments described below may also be used in any appropriate combination as long as the processes do not conflict with each other.

FIG. 1 is a block diagram illustrating an example of a configuration of a simulation apparatus 1 according to an embodiment. The simulation apparatus 1 illustrated in FIG.

1 is, for example, an information processing apparatus, such as a personal computer (PC). The simulation apparatus 1 simulates, based on input information, purchasing behaviors of pedestrian agents moving around facilities in a virtual space in accordance with purchasing behavioral objectives and performs a people flow simulation that imitates the flow of pedestrians. This pedestrian agent is an example of an "agent". As illustrated in FIG. 1, the simulation apparatus 1 includes an input unit 10, an input information storage unit 20, a simulation management unit 30, a sign system/space changing unit 40, a pedestrian behavior execution unit 50, a simulation result output unit 60, and an agent information storage unit 70.

The input unit 10 receives input information, such as space information 11, a sign system plan 12, and pedestrian information 13, that is related to simulation received from an input device, such as a mouse or a keyboard. The input unit 10 stores the received input information in the input information storage unit 20. Namely, regarding each of the pedestrian agents related to the people flow simulation, the input unit 10 stores, in the input information storage unit 20, the input information indicating a plurality of purchasing behavioral objectives, an initial purchasing behavioral objective, and a plurality of facilities in which the plurality of purchasing behavioral objectives can be implemented and then provides the input information to the simulation management unit 30.

The input information storage unit 20 stores the input information, such as the space information 11, the sign system plan 12, and the pedestrian information 13, that has been input from the input unit 10 in a storage device, such as a random access memory (RAM) or a hard disk drive (HDD).

The space information 11 is information indicating the structure of the virtual space, such as a shopping mall or an airport, that is related to a simulation. Specifically, in the space information 11, a cell environment related to the virtual space (the area; a floor number; the location of walls, walkways, facilities, etc.) strolled by the pedestrian agents in the simulation and a network environment related to connections to nodes (walkways, facilities, etc.) in the space are described. A user inputs, to the simulation apparatus 1, the space information 11 on the virtual space that is an inspection target for the simulation.

Figure 2:
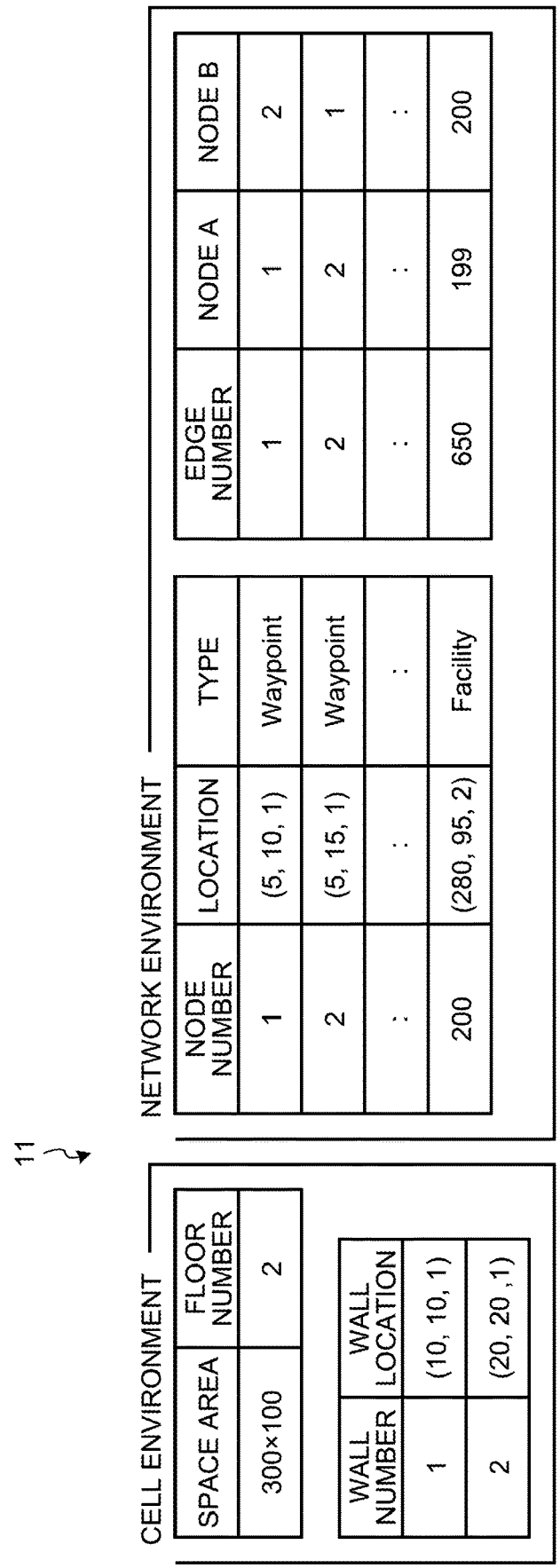
FIG. 2 is a diagram illustrating space information.

FIG. 2 is a diagram illustrating the space information 11. As illustrated in FIG. 2, in the space information 11, the cell environment, such as the area of the virtual space, a floor number, a wall number indicating a cell (wall) that is prohibited by pedestrian agents to enter, the location of the wall, and the like are described. Furthermore, in the space information 11, the network environment, such as the type of nodes including the coordinates of nodes, walking object (Way point), and facilities, is described for each node number that indicating a node. Furthermore, in the network environment, an edge number and node numbers indicating nodes that are connected with each other are described for each edge between nodes in which walking is available.

The sign system plan 12 is information indicating, in a shopping mall, an airport, or the like, the layout or the content of the sign providing various guidance items. Specifically, in the sign system plan 12, the attribute (location, transfer level, distance, angle, and visibility duration) that corresponds to the feature of each of the signs and information (area information, facility information, guidance information, and difficulty level of memory) that is related to each of the signs and that is used to pass a pedestrian agent (allow a pedestrian agent to recognize) are described. The user inputs the sign system plan 12 that is the inspection target for the simulation to the simulation apparatus 1.

FIG. 3 is a diagram illustrating the sign system plan 12. As illustrated in FIG. 3, in the sign system plan 12, the attribute (location, transfer level, distance, angle, and visibility duration) that corresponds to the feature of each of the signs is described for each sign number used to identify the sign.

The "location" is the placement location of a sign in the virtual space and in which, for example, the placement location on the floor and the placement floor number are indicated by three-dimensional coordinates. The "transfer level" is a value indicating the transfer level of a transfer to a pedestrian agent (for example, evaluation values indicated in three stages A to C). The "distance" is a value indicating the distance in the virtual space in which a sign can be recognized by a pedestrian agent. The "angle" is a value indicating the angle in which a sign can be recognized by a pedestrian agent. The "visibility duration" is a value indicating time needed for a pedestrian agent to recognize the content of the sign.

Regarding the attribute that corresponds to the feature of each of the signs in the sign system plan 12, a value evaluated based on the size or the content of each of the signs that are planned to be placed. For example, regarding a large sign with little content to be delivered (for example, guiding of an area except for guiding small facilities), the transfer level and the distance are set to have a large value and the visibility duration is set to have a small value. Furthermore, regarding the sign with large content even if the size of the sign is the same (for example, including guiding of a facility in details), the transfer level and the distance are set to have a small value and the visibility duration is set to have a large value.

Furthermore, in the sign system plan 12, for each sign number for identifying a sign, information (area information, facility information, guidance information, and difficulty level of memory) to be recognized by a pedestrian agent is described.

The "area information" is information related to an area to be passed to a pedestrian agent (allows a pedestrian agent to recognize) and is, for example, a restaurant, an exchange office (exchange counter), a shop (store), and the like. The "facility information" is information related to a facility that is passed to a pedestrian agent (allows a pedestrian agent to recognize) and is, for example, a number indicating the facility, or the like. The "guidance information" is information for guiding the area indicated by the area information or the location related to the facility indicated by the facility information to a pedestrian agent. For example, the "guidance information" may also be information indicating the orientation, the path, or the like from the location in which the sign is present toward the area or the facility or information indicating by a node number or an edge number in a virtual space. The "difficulty level of memory" is a value indicating the level that is less likely to forget the recognized guidance information (hereinafter, also referred to as recognition information) in a pedestrian agent in which the guidance information has been recognized. For example, the "difficulty level of memory" indicates that a pedestrian agent is less likely to forget the recognition information as the value is increased.

Regarding the information related to recognition of each of the signs indicated in the sign system plan 12, the value evaluated based on the content or the like of each of the signs that are planned to be placed. For example, regarding the sign with the sign number of "1" and the sign that guides the area (the guidance of the facility has been omitted), the predetermined value is described each of the area information, the guidance information, and the difficulty level of memory and NULL data ("–" in the example illustrated in FIG. 3) is described in the facility information. Furthermore, regarding the sign that has the sign number of "2" and that also guides the facility in addition to the area, a predetermined value is described in each of the area information, the facility information, the guidance information, and the difficulty level of memory. In this way, hierarchy may also be provided to the content of the guiding of a sign, such as the sign that guides the area or the sign that guides the facility together with the area.

Furthermore, the content of the sign that guides the area in which the guidance of the facility has been omitted is simpler than the content of the sign that guides the facility together with the area. Such simple guidance content can be evaluated as the content that is less likely to be forgotten for a pedestrian. Thus, regarding the difficulty level of memory, a higher value is set to the sign in which the content of the guidance is similar. For example, the value of the difficulty level of memory of the sign that has the sign number of "1" that guides the area is set to be higher than the sign that has the sign number of "2" and that also guides the facility in addition to the area.

The pedestrian information 13 is information indicating the pedestrian agent in a virtual space. Specifically, the pedestrian information 13 is information related to the occurrence probability in which a pedestrian agent occurs in an appearance point associated with an entrance in a virtual space or related to the type of the pedestrian agent that occurs. Furthermore, the type of pedestrian agents includes, for example, the gender, such as a male or a female or categories based on ages, such as children (infants, elementary school students, junior high school students, and senior high school students), adults (ages of 20 to 40, 40 to 60, and 60 or over), and the like. The user inputs the pedestrian information 13 related to the pedestrian that is an inspection target for a simulation to the simulation apparatus 1.

FIG. 4 is a diagram illustrating the pedestrian information 13. As illustrated in FIG. 4, in the pedestrian information 13, the occurrence probability of a pedestrian agent and the characteristic of the pedestrian agent occurring for each number that indicates the type of pedestrian are described. Example of the characteristic of the pedestrian agent include "occurrence rate", "range of visibility", "viewing angle", "storage time", "recall category set", "attractiveness (facility 1) . . . (facility 30)", and the like.

The "occurrence rate" indicates the rate of the occurrence of each of the pedestrian agents. The "range of visibility" and the "viewing angle" indicate the distance and the angle that can be visually recognized by each of the pedestrian agents in the virtual space. The "storage time" indicates the period of time for storing the information recognized by each of the pedestrian agents.

The "recall category set" is a set of the category (purchasing behavioral objective) recalled by each of the pedestrian agents and the values indicating the purchasing behavioral objective recalled by the agent is listed in the priority order. An example of this purchasing behavioral objective includes, for example, a meal, shopping, and the like and the value associated with the meal, shopping, and the like is indicated. For example, in the "recall category set", the values associated with the meal, shopping, and the like recalled by each of the pedestrian agent is indicated in the priority order. The "attractiveness (facility 1) . . . (facility 30)" indicates the effect for each facility in each of the pedestrian agents.

Regarding the content of the pedestrian information 13, the value assuming a pedestrian who visits a virtual space, such as a shopping mall or an airport, related to the simulation is input. For example, in a case where many adults (ages of 20 to 40 and ages of 40 to 60) use and few children (infants, elementary school students, junior high school students, and senior high school students) use, the occurrence rate of the type of pedestrian associated with adults is set to have a larger value and the occurrence rate of the type of pedestrian associated with children is set to have a smaller value. Furthermore, also regarding the purchasing behavioral objective held by the agent, for example, the priority order of shopping is set to have a higher value for adult females and the priority order of a meal is set to have a higher value for adult males, the value that is in accordance with the pedestrians who visit the virtual space is set.

The simulation management unit 30 manages the process of simulating the behaviors of the pedestrian agents in the virtual space performed in the pedestrian behavior execution unit 50 based on the input information (the space information 11, the sign system plan 12, and the pedestrian information 13) stored in the input information storage unit 20. Specifically, the simulation management unit 30 reads the input information stored in the input information storage unit 20 and the results obtained by sequentially simulating the behaviors of the pedestrian agents stored in the agent information storage unit 70 (location information on the pedestrian agents and the recognition information on the pedestrian agents) and outputs the read information to the pedestrian behavior execution unit 50.

Furthermore, regarding the recognition information on the pedestrian agents, the simulation management unit 30 sets a limit in accordance with the progress of the simulation in the pedestrian behavior execution unit 50 and outputs the information to the pedestrian behavior execution unit 50 (details will be described later). Consequently, in the pedestrian behavior execution unit 50, based on the recognition information limited by the simulation management unit 30, the behaviors of the pedestrian agents are simulated.

Furthermore, based on the input information that was input from the input unit 10 and that indicates a plurality of purchasing behavioral objectives, an initial purchasing behavioral objective, and a plurality of facilities in which the plurality of purchasing behavioral objectives can be implemented, the simulation management unit 30 changes, regarding each of the plurality of pedestrian agents, based on the condition that has been set in accordance with the facility search behavior with respect to the facility that is selected in response to the purchasing behavioral objective of each of the pedestrian agents at the time of execution of a simulation, a purchasing behavioral objective of each of the pedestrian agents. The simulation management unit 30 notifies the pedestrian behavior execution unit 50 of the purchasing behavioral objective of the changed pedestrian agent. Consequently, in the pedestrian behavior execution unit 50, more humane behavior, such as a purchasing behavioral objective is changed during, for example, a behavior of the pedestrian agent can be simulated.

Specifically, the simulation management unit 30 sequentially read the simulation result of the behavior of each of the pedestrian agents stored in the agent information storage unit 70 and determines whether the state of the pedestrian agent due to the behavior of the pedestrian agent satisfies the condition (category switch condition) of the category switch that is previously set.

Then, if the category switch condition is satisfied, the simulation management unit 30 changes (switches) to another purchasing behavioral objective that is other than the purchasing behavioral objective that is currently held by the pedestrian agent included in the plurality of categories (purchasing behavioral objective) indicated by the recall category set. For example, the simulation management unit 30 changes to the behavioral objective having the priority order that is lower than that of purchasing behavioral objective held by the current pedestrian agent from among the purchasing behavioral objectives listed in the priority order in the recall category set.

Then, the simulation management unit 30 notifies the pedestrian behavior execution unit 50 of the switched purchasing behavioral objective as a new purchasing behavioral objective of the pedestrian agent in the simulation (at the time of execution of simulation).

Furthermore, the simulation management unit 30 outputs, to the simulation result output unit 60 the result (the location information on the pedestrian agents and the recognition information on the pedestrian agents) obtained by the pedestrian behavior execution unit 50 sequentially simulating the behaviors of the pedestrian agents.

The sign system/space changing unit 40 changes, based on an operation instruction received from a user by an input device, such as a mouse or a keyboard, the sign system plan 12 and the space information 11 stored in the input information storage unit 20. Consequently, the user can appropriately change the sign system plan 12 and the space information 11 in accordance with a sign system and an arrangement plan (measures and policies) of facilities.

The pedestrian behavior execution unit 50 sequentially simulates the behaviors of the pedestrian agents by using the input information (the space information 11, the sign system plan 12, and the pedestrian information 13) as the initial condition. Specifically, the pedestrian behavior execution unit 50 simulates the behaviors of the pedestrian agents performed in the subsequent time based on the result (the location information on the pedestrian agents and the recognition information on the pedestrian agents) obtained by simulating the behaviors of the pedestrian agents by the previous time (the location information on the pedestrian agents and the recognition information on the pedestrian agents). The pedestrian behavior execution unit 50 outputs the sequentially simulated result to the simulation management unit 30.

The simulation result output unit 60 stores the result (the location information on the pedestrian agents and the recognition information on the pedestrian agents) obtained by sequentially simulating the behaviors of the pedestrian agents in the agent information storage unit 70. Furthermore, the simulation result output unit 60 outputs the simulation result stored in the agent information storage unit 70 to a display device to be displayed or a printer to be printed. The output of this simulation result may also be performed by sequentially outputting the result of the simulation that was sequentially performed. Furthermore, the result of accumulating the simulation performed in a predetermined time period may also be output.

The agent information storage unit 70 stores the simulation result of information (location information and the recognition information) or the like that is related to the pedestrian agents and that is the result of sequential simulation in a storage device, such as a RAM or a HDD.

Figure 5:
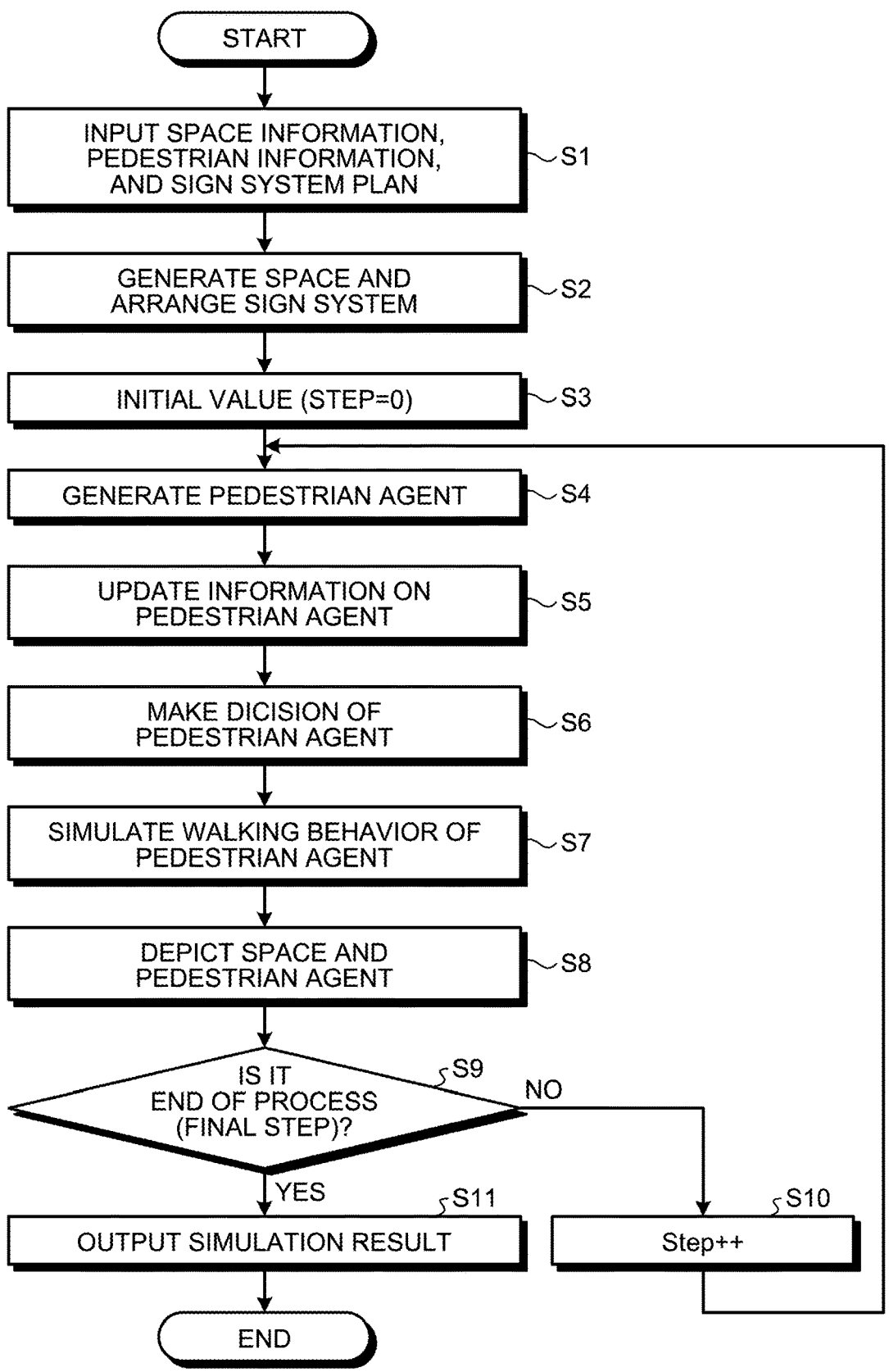
FIG. 5 is a flowchart illustrating an example of an operation of the simulation apparatus.

In the following, an operation of the simulation apparatus 1 will be described in detail. FIG. 5 is a flowchart illustrating an example of an operation of the simulation apparatus.

As illustrated in FIG. 5, if a process is started, the input unit 10 receives an input of the space information 11, the pedestrian information 13, and the sign system plan 12 and stores the received information into the input information storage unit 20 (S1). Then, based on the input space information 11 and the sign system plan 12, the simulation management unit 30 generates a virtual space and performs arrangement of the sign system in the virtual space (S2).

Figure 6:
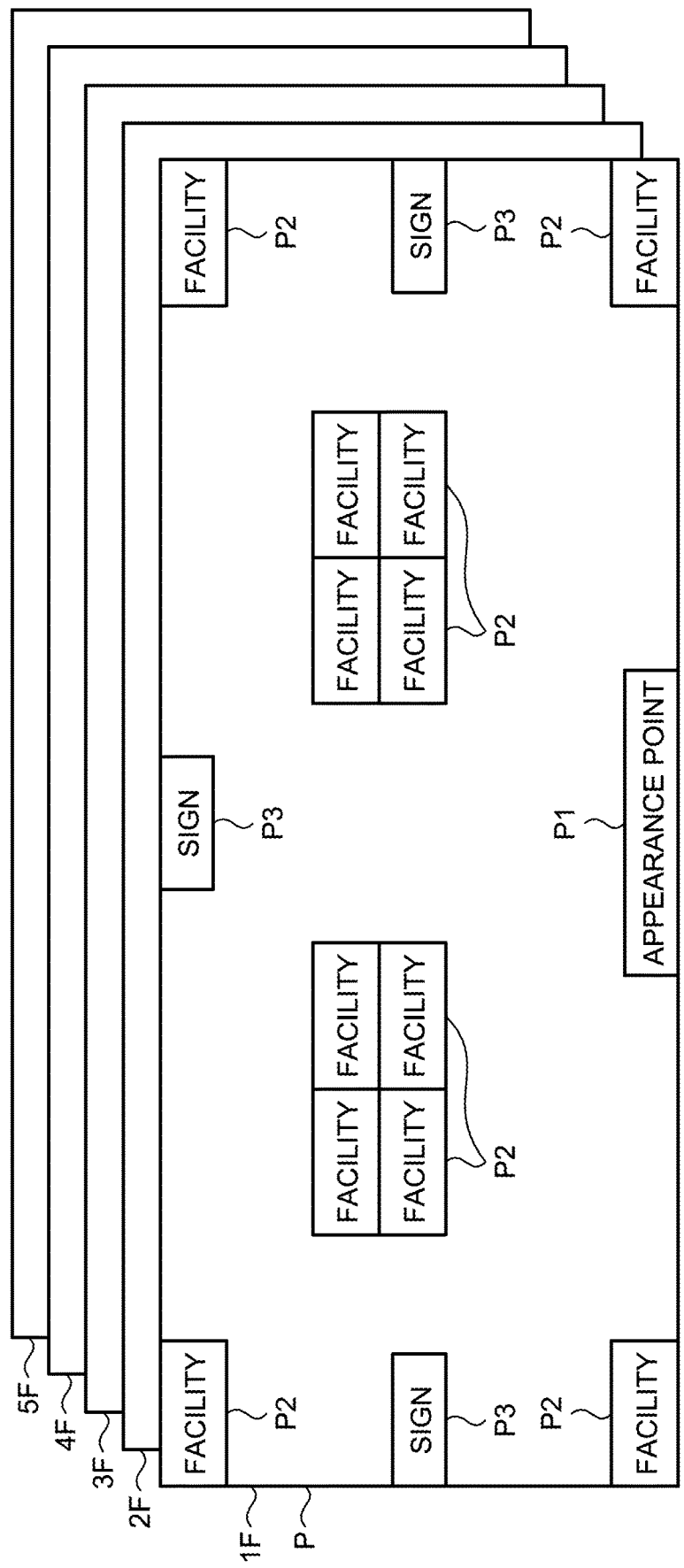
FIG. 6 is a diagram illustrating virtual space.

FIG. 6 is a diagram illustrating a virtual space P. As illustrated in FIG. 6, the simulation management unit 30 generates the virtual space P based on the cell environment (the area of the space, a floor number, the location of walls) of the space information 11. In the example illustrated in FIG. 6, the virtual space P has been generated on each of the floors 1F to 5F. Then, based on the network environment (the location of a node, the type, the connection relationship between nodes) of the space information 11, the simulation management unit 30 arranges an appearance point P1, facilities P2, and the like in the virtual space P. Furthermore, the simulation management unit 30 places a sign P3 in the virtual space P based on the location of the sign system plan 12.

Figure 7:
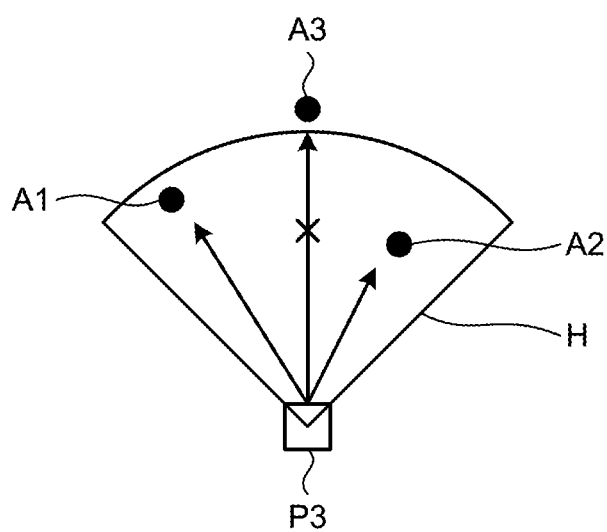
FIG. 7 is a diagram illustrating a reach range of guidance information by using a sign.

FIG. 7 is a diagram illustrating a reach range of guidance information by using a sign P3. As illustrated in FIG. 7, in the sign P3 arranged in the virtual space P, a reach range H associated with the transfer level, the distance, and the angle in the sign system plan 12 is set. Thus, it is assumed that pedestrian agents A1 and A2 located in the reach range H can acquire (recognize) the guidance information from the sign P3 and a pedestrian agent A3 located outside the reach range H is not able to acquire (recognize) the guidance information from the sign P3.

Then, the simulation management unit 30 sets an initial value (Step=0) of the number of steps associated with the start time of the simulation (S3). Thereafter, when repeating the processes at S4 to S10, the simulation management unit 30 moves forward the simulation time by incrementing the set step. Consequently, the simulation management unit 30 causes, in the processes performed at S4 to S10, the pedestrian behavior execution unit 50 to perform simulation that moves forward in association with the step for each time. Furthermore, the duration of the simulation that moves forward due to an increment of the step may be arbitrarily set and, for example, a user previously set at intervals of several seconds to several tens of seconds.

Then, the simulation management unit 30 generates a pedestrian agent in the appearance point P1 based on the occurrence rate for each occurrence probability and pedestrian type of the pedestrian information 13 (Step S4). Specifically, the simulation management unit 30 verifies, based on the generated random numbers, whether a pedestrian agent has been generated at the set occurrence probability and the occurrence rate. Then, the simulation management unit 30 generates, based on the verification result, a pedestrian agent with the type indicating that occurrence is present.

Furthermore, the simulation management unit 30 allocates, for each generated pedestrian agent, identification information, such as identification data (ID), and stores initial information, such as the location of the pedestrian agent, a recall category set, and recognition information, in the agent information storage unit 70.

Figure 8:
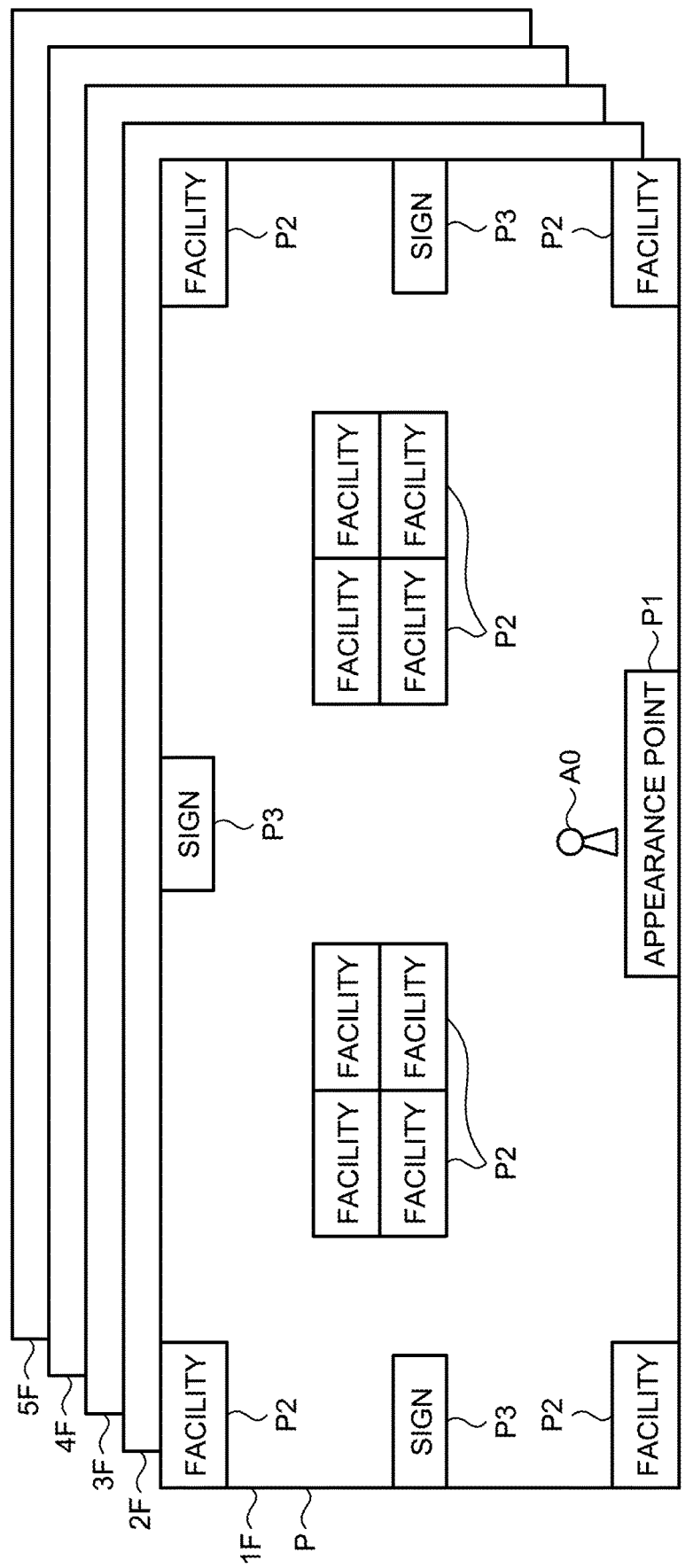
FIG. 8 is a diagram illustrating generating a pedestrian agent.

FIG. 8 is a diagram illustrating generating a pedestrian agent. As illustrated in FIG. 8, based on the occurrence probability and based on the occurrence rate for each pedestrian type, a pedestrian agent A0 with the type indicating occurrence is generated in the appearance point P1. For example, in a case where the occurrence probability is 0.8, the pedestrian agent A0 is generated with a probability of 80% in a single step.

Figure 9:
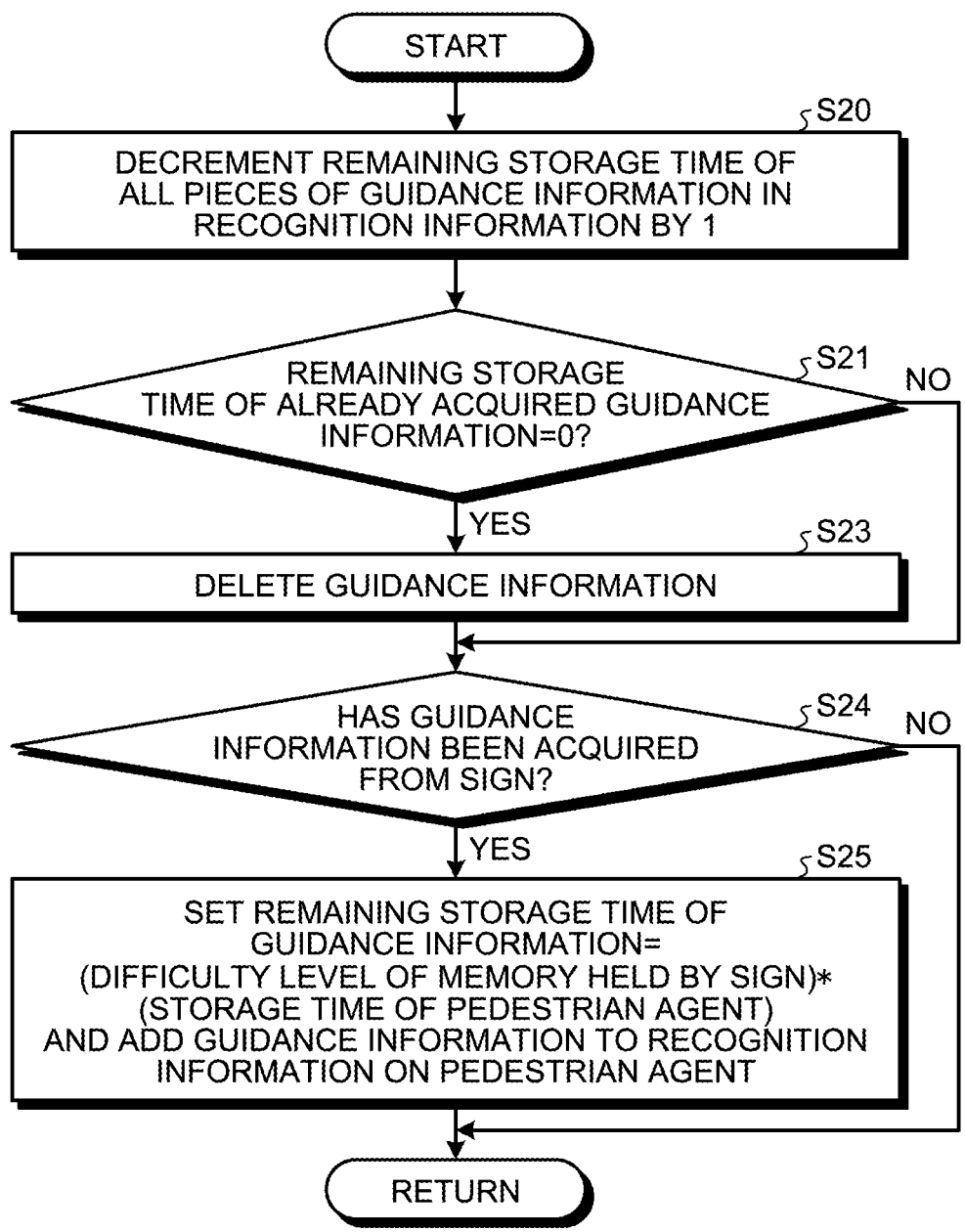
FIG. 9 is a flowchart illustrating an example of an update process of recognition information of the pedestrian agent.

Then, the simulation management unit 30 performs an update process of reading the recognition information on each of the pedestrian agents A0 generated in the virtual space P from the agent information storage unit 70 and updating the read recognition information (S5). FIG. 9 is a flowchart illustrating an example of an update process of recognition information of the pedestrian agent A0. Furthermore, FIG. 9 illustrates an example of the update process related to the single pedestrian agent A0; however, the simulation management unit 30 performs the update process illustrated in FIG. 9 on all of the pedestrian agents A0 generated in the virtual space P.

As illustrated in FIG. 9, when the update process is started, the simulation management unit 30 refers to the recognition information on the pedestrian agent A0 stored in the agent information storage unit 70 and decrements the remaining storage time that is set in all of the pieces of guidance information (guidance information that has been set as recognition information) in the recognition information on the pedestrian agent A0 by 1 (S20). With this process performed at S20, the remaining storage time that has been set in the guidance information is reduced in accordance with the elapse of simulation time.

Then, the simulation management unit 30 determines whether the remaining storage time of the already acquired guidance information is zero (S21). In a case of remaining storage time=0 (YES at S21), the simulation management unit 30 deletes the guidance information indicating the remaining storage time=0 from the recognition information (S23) and proceeds the process to S24. In a case where the remaining storage time is not zero (NO at S21), the simulation management unit 30 proceeds the process to S24 without deleting the guidance information from the recognition information.

Consequently, during the time in which the remaining storage time is not reduced to zero, the recognized guidance information is used in the simulation of the pedestrian agent A0. Then, in accordance with the elapse of simulation time, the recognized guidance information is deleted at the time in which the remaining storage time is reduced to zero and the use of the recognized guidance information with respect to the simulation is limited.

At S24, the simulation management unit 30 determines, based on the position of the pedestrian agent A0 in the virtual space P, whether the pedestrian agent A0 has acquired (recognized) the guidance information from the sign P3. Specifically, based on whether the position of the pedestrian agent A0 is within the reach range H of the sign P3 that is placed in the virtual space P, the simulation management unit 30 determines whether the pedestrian agent A0 has acquired the guidance information from the sign P3.

If the pedestrian agent A0 has acquired the guidance information from the sign P3 (YES at S24), the simulation management unit 30 sets the remaining storage time of the acquired guidance information=(difficulty level of memory held by the sign P3)*(storage time of the pedestrian agent A0). Then, in addition to the remaining storage time, the simulation management unit 30 adds the guidance information to the recognition information on the pedestrian agent A0 (S25).

In this way, at S25, when the pedestrian agent A0 recognizes the guidance information, the simulation management unit 30 sets the remaining storage time as the initial value related to the limitation of the guidance information. For example, regarding the guidance information in which the difficulty level of memory that has been set in the sign P3 is high and that is less likely to be forgotten, the value of the remaining storage time is set to be large. Furthermore, regarding the pedestrian agent A0 that has long storage time and that remembers the recognized guidance information for a long time, the value of the remaining storage time is set to be large. Furthermore, regarding the remaining storage time, the setting may also be performed based on both the difficulty level of memory held by the sign P3 and the storage time of the pedestrian agent A0 or may also be performed based on either one of them.

Furthermore, the update process of the recognition information described above has been exemplified by using a case in accordance with the course of steps (elapse of simulation time); however, the example is not limited to time as long as the update process is performed in accordance with the progress of a simulation. For example, recognition information may also be limited based on the number of footsteps of the pedestrian agent A0 in accordance with the progress of a simulation or based on the behavior progress of the pedestrian agent A0, such as the number of times the direction has been changed. For example, it may also be possible to count the number of footsteps of the pedestrian agent A0 and the number of times of a change of direction in accordance with the progress of a simulation in a manner similar to that used to count the remaining storage time and delete the recognized guidance information when the counted value becomes equal to or greater than a predetermined value. In this way, by limiting the recognition information based on not only the elapse of simulation time but also the behavior progress of the pedestrian agent A0, it is possible to implement more practical simulation that is in accordance with a behavior of the pedestrian agent A0.

Figure 10:
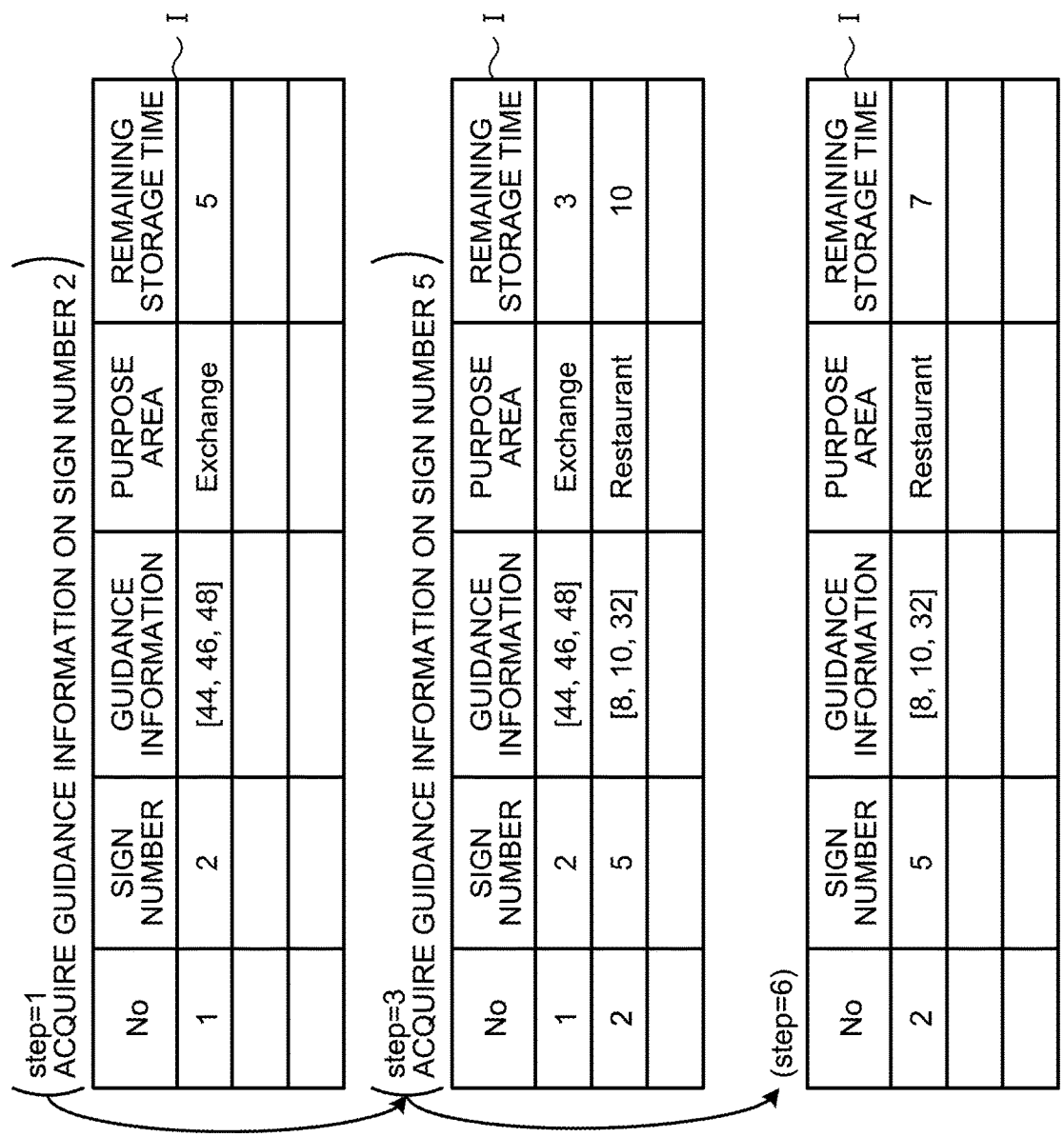
FIG. 10 is a diagram illustrating an update of the recognition information.

FIG. 10 is a diagram illustrating an update of the recognition information. As illustrated in FIG. 10, it is assumed that, at the timing of step=1, the pedestrian agent A0 acquires the guidance information on the sign number 2. At this time, in recognition information I on the pedestrian agent A0, the guidance information on the sign number 2 is stored together with the remaining storage time=5.

Then, it is assumed that, at the timing of step=3, the pedestrian agent A0 acquires the guidance information on the sign number 5. At this time, in the recognition information I on the pedestrian agent A0, the guidance information on the sign number 5 is stored together with the remaining storage time=10. Furthermore, regarding the guidance information on the sign number 2, because two steps have progressed, the remaining storage time is set to 3. Then, at the timing of step=7, because the guidance information on the sign number 2 enters the remaining storage time=0, the guidance information is deleted.

Figure 11:
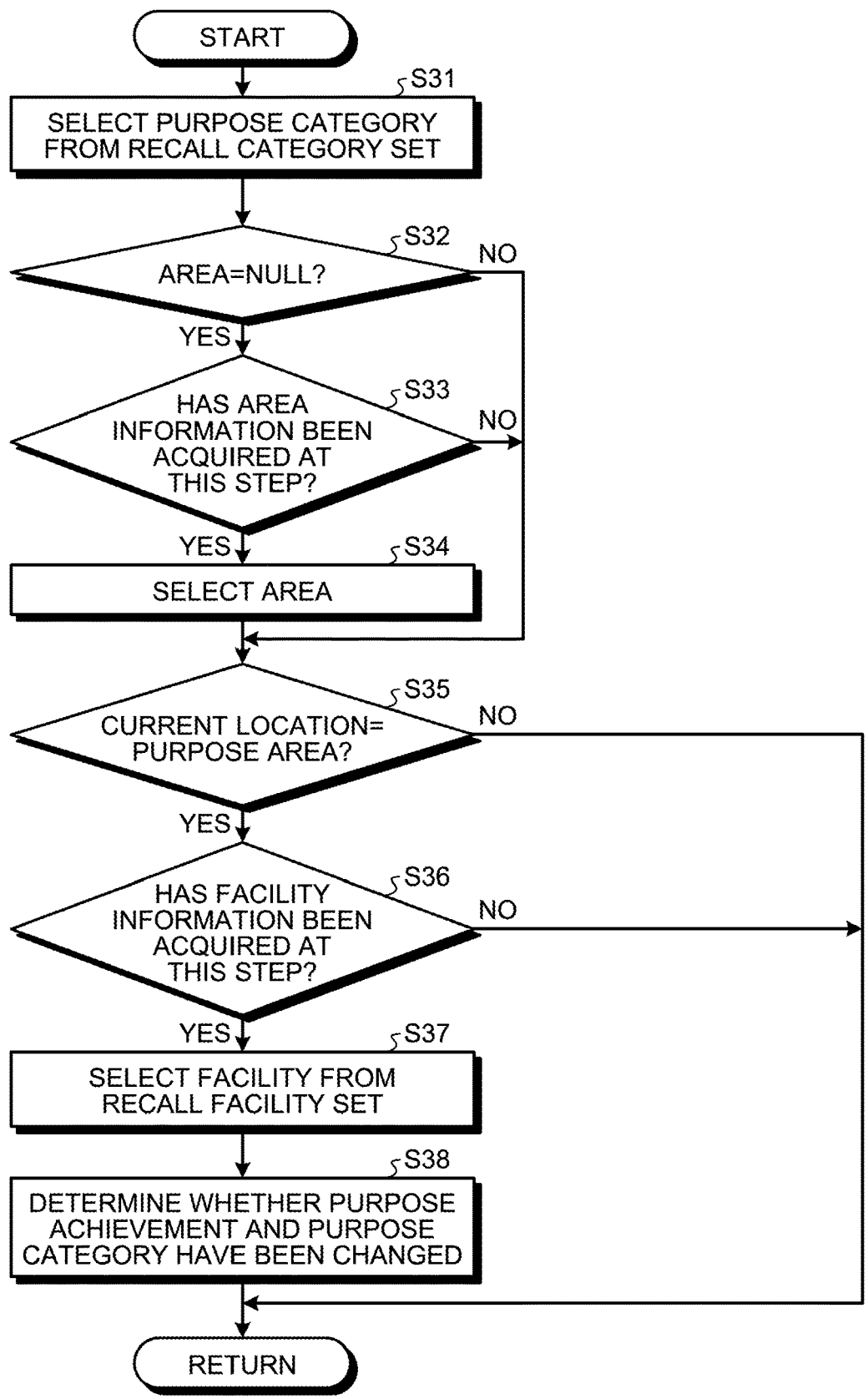
FIG. 11 is a flowchart illustrating an example of a decision making process of the pedestrian agent.

A description will be given here by referring back to FIG. 5. After the process performed at S5, based on the pedestrian information 13 and the recognition information I, the simulation management unit 30 makes a decision of each of the pedestrian agents A0 generated in the virtual space P (S6). FIG. 11 is a flowchart illustrating an example of a decision making process of the pedestrian agent A0. Furthermore, FIG. 11 exemplifies the process of making a decision of the single pedestrian agent A0; however, the simulation management unit 30 performs the process illustrated in FIG. 11 on all of the pedestrian agents A0 that are set in the virtual space P.

As illustrated in FIG. 11, when the process is started, the simulation management unit 30 performs, regarding the pedestrian agent A0, a selection process of selecting the purpose category that is the purchasing behavioral objective from the recall category set (S31).

Figure 12:
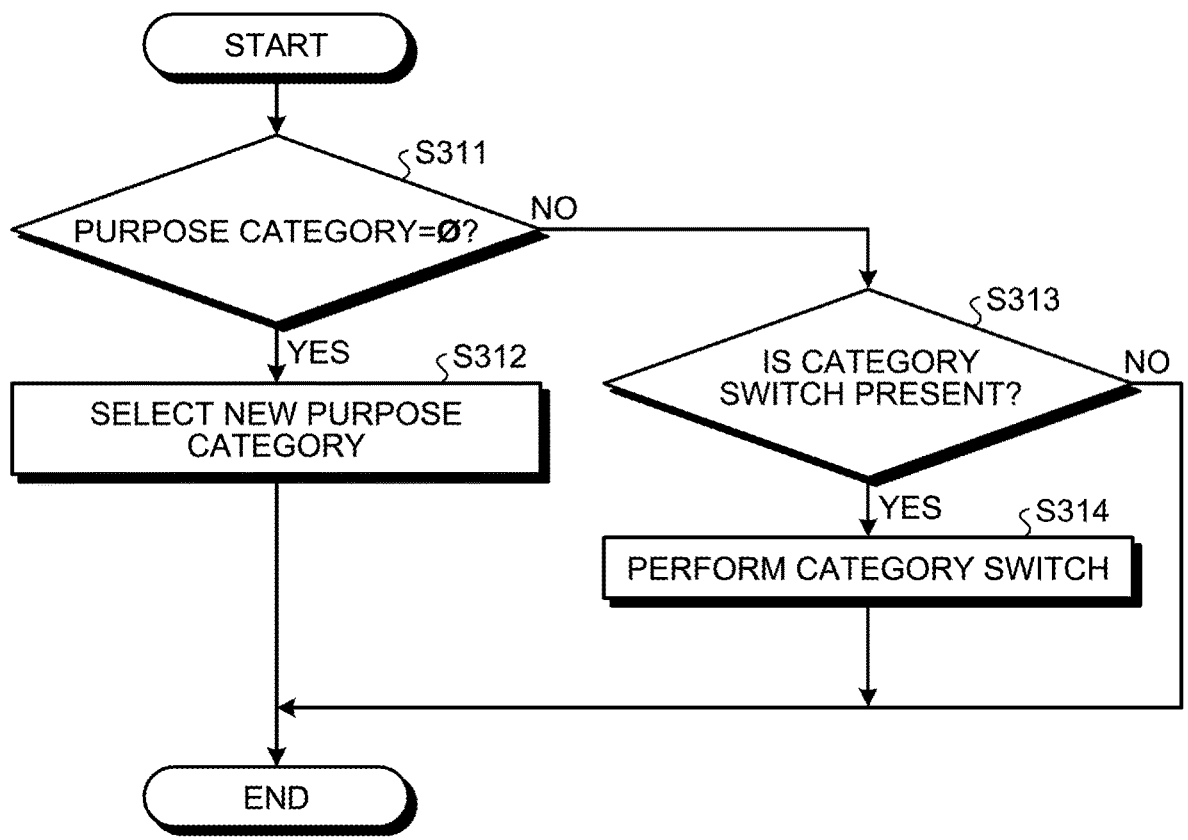
FIG. 12 is a flowchart illustrating an example of a selection process of a purpose category.

FIG. 12 is a flowchart illustrating an example of a selection process of a purpose category. As illustrated in FIG. 12, when the selection process is started, the simulation management unit 30 determines whether the purpose category is zero (empty set) (S311). For example, if the purchasing behavioral objective (purpose category) of the pedestrian agent A0 has not been selected at the initial time or the like of the process, the simulation management unit 30 determines the purpose category is zero.

If the purpose category is zero (YES at S311), the simulation management unit 30 selects a new purpose category that is used as the purchasing behavioral objective from the recall category set (S312) and ends the selection process. Specifically, the simulation management unit 30 selects, as a new purpose category, the highest priority order among unselected categories (purchasing behavioral objective) included in the recall category set. For example, at the initial time of the process, the first category included in the recall category set is selected.

If the purpose category is not zero (NO at S311), this indicates that the pedestrian agent A0 has already have the purpose category corresponding to the purchasing behavioral objective and in the course of behavior (during simulation). In this case, the simulation management unit 30 determines whether, in the change judgement process of the purpose category (S38), a category switch is present (category switch=1) (S313).

If the category switch is present (YES at S313), the simulation management unit 30 performs a category switch that is a process of changing the purchasing behavioral objective (purpose category) held by the pedestrian agent A0 to another category included in the recall category set of the pedestrian agent A0 (S314), and ends the selection process. If the category switch is not present (NO at S313), the simulation management unit 30 ends the selection process without performing the category switch.

Specifically, when the simulation management unit 30 performs the category switch, if the category switch is present (category switch=1) and the category to be switched is specified, the simulation management unit 30 selects the specified category as a new purpose category. Furthermore, if the category to be switched is not specified, the simulation management unit 30 selects, as a new purpose category, the highest priority order of the category (purchasing behavioral objective) that is included in the recall category set and that is held by the pedestrian agent A0 other than the categories that have reached their objectives. With this category switch, in the simulation apparatus 1, the behavioral objective of each of the pedestrian agents A0 at the time of simulation is changed.

A description will be given here by referring back to FIG. 11 and the process subsequent to the selection process (S31) will be described. Subsequently, the simulation management unit 30 determines whether the pedestrian agent A0 is the target area=0 (NULL), i.e., determines whether an area associated with the purpose category has been selected (S32).

If the target area has not been selected (YES at S32), the simulation management unit 30 determines whether the area information (guidance information on a way to the area) on the area associated with the purpose category has been acquired (recognized) at this step (S33). Specifically, the simulation management unit 30 refers to the recognition information I at the time of this step and determines whether the guidance information on the target area associated with the already selected purpose category is included in the recognition information I.

When having acquired (recognized) the area information (guidance information) on the area targeted by the pedestrian agent A0 (YES at S33), the simulation management unit 30 selects the acquired area (S34). Consequently, regarding the pedestrian agent A0, the behavior with respect to the area in which guidance information has already been recognized is decided. Furthermore, if the target area has already been selected (NO at S32) and if the pedestrian agent A0 has not recognized the guidance information on the target area (NO at S33), the simulation management unit 30 skips the process at S34 and proceeds to the process at S35.

Then, the simulation management unit 30 determines whether the current location of the pedestrian agent A0 is the target area of the purpose category (S35). If current location=target area (YES at S35), the simulation management unit 30 determines whether the facility information (guidance information on a way to the facility) has been acquired (recognized) at this step (S36). Specifically, the simulation management unit 30 refers to the recognition information I at the time of this step and determines whether the guidance information on the facility in the target area that is the current location is included in the recognition information I.

If the pedestrian agent A0 has already acquired (recognized) the guidance information on the way to the facility (YES at S36), the simulation management unit 30 selects a facility from a recall facility set of the pedestrian agent A0 (S37). Specifically, from among the facilities (recall facility set) recognized by the pedestrian agent A0, the simulation management unit 30 selects a facility that is a move target based on a purpose or a state of the pedestrian agent A0.

For example, the simulation management unit 30 selects a facility by performing cut-off a period of time to the end of the use of the facility included in the recall facility set exceeding a predetermined threshold. As an example, the simulation management unit 30 narrow down to the facilities of (forecast move time to a facility)+(waiting time)+(utility time)<threshold.

Then, selecting the facility that is the move target from the narrowed down set is performed by using a known method, such as discrete choice models. For example, P (i)=(those included in a choice set (facility i))×expU (i)/ΣexpU (n) is calculated and the one having a high value is selected. Furthermore, U (i)=(attractiveness of a facility i)+β1·(forecast move time to a facility i)+β2·(waiting time of the facility i), where β1 and β2 are previously set weighting values. Here, U (i) is referred to as a utility function and the value calculated from U (i) is referred to as a utility value.

Then, based on the result of sequential simulation performed on the behavior of the pedestrian agent A0 up to this time, the simulation management unit 30 performs a change judgement process of determining whether purpose achievement and a purpose category of the pedestrian agent A0 have been changed (S38) and returns the process. Furthermore, if the current location is not the target area (NO at S35) or if the pedestrian agent A0 has not acquired (recognized) the guidance information on the way to the facility (NO at S36), the simulation management unit 30 skips the processes at S37 and S38 and returns the process.

Figure 13:
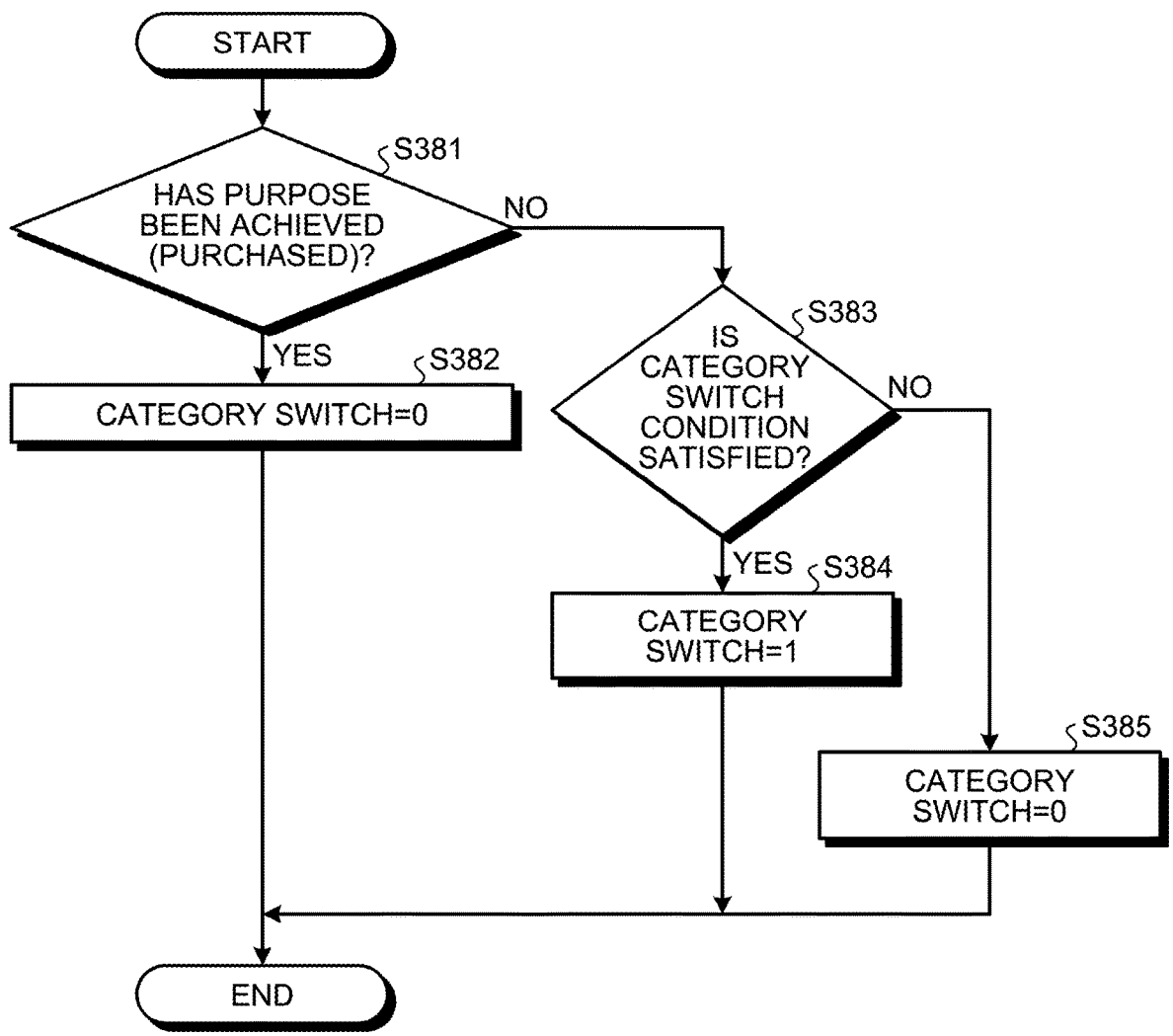
FIG. 13 is a flowchart illustrating an example of a change judgement process of the purpose category.

FIG. 13 is a flowchart illustrating an example of a change judgement process of the purpose category. As illustrated in FIG. 13, if the process is started, the simulation management unit 30 determines, based on the behaviors of the pedestrian agent A0 up to this time, whether a purpose (product purchase, etc.) of the pedestrian agent A0 has been achieved (S381). Specifically, the simulation management unit 30 determines whether the pedestrian agent A0 reached the facility targeted for a move and determines whether a purpose has been achieved by performing a product purchase or the like in the reached facility. Furthermore, it is assumed that the determination of the behaviors, such as a product purchase in the reached facility, of the pedestrian agent A0 is performed based on a predetermined probability.

If the objective has been achieved (YES at S381), the simulation management unit 30 continues the simulation as the completion of the objective of the purchasing behavioral objective (purpose category) held by the pedestrian agent A0. Specifically, the simulation management unit 30 sets the category switch to 0 (S382) and ends the change judgement process.

If the objective has not been achieved (NO at S381), the simulation management unit 30 determines whether the result of sequential simulation of the behaviors of the pedestrian agent A0 up to this point (the state of the pedestrian agent A0) satisfies the category switch condition (S383).

As this category switch condition, during the simulation, if the behavior of the pedestrian agent A0 is continued (in the state of the unchanged purchasing behavioral objective) without changing the purchasing behavioral objective (purpose category), the category switch may be performed. Consequently, the simulation management unit 30 can reproduce a decision made by a pedestrian occurring in a case where, for example, the pedestrian loses interest in searching for the facility based on the same purchasing behavioral objective due to a behavior that is continued by maintaining the purchasing behavioral objective and then changes to another purchasing behavioral objective.

As an example, regarding the pedestrian agent A0 in which the number of visited facilities reaches a predetermined number without changing the purchasing behavioral objective, the simulation management unit 30 determines that the category switch condition is satisfied. Alternatively, regarding the pedestrian agent A0 that moves forward by a predetermined number of steps of simulation in the state in which the purchasing behavioral objective is not changed (a predetermined time has elapsed in the state in which the purchasing behavioral objective is not changed), the simulation management unit 30 determines that the category switch condition is satisfied.

Furthermore, as the category switch condition, a category switch may be performed if another purchasing behavioral objective that co-occurs from the current purchasing behavioral objective of the pedestrian agent A0 is present during a simulation. For example, in the state of the pedestrian agent A0 behaved having the current purchasing behavioral objective of the pedestrian agent A0, for example, if a purchasing behavioral objective co-occurring from the recognition information I at a predetermined probability (switch probability) is present, the simulation management unit 30 determines that the category switch condition is satisfied so as to change to the co-occurring the purchasing behavioral objective.

As an example, if information (for example, the information indicating the facility P2 or the sign P3) related to another purchasing behavioral objective (purpose category) is included in the recognition information I, the simulation management unit 30 determines that the category switch condition is satisfied so as to change to another purchasing behavioral objective at the switch probability. Consequently, the simulation management unit 30 can reproduce the decision made by the pedestrian occurring in a case where the pedestrian noticed another purchasing behavioral objective from a predetermined purchasing behavioral objective and changes the purchasing behavioral objective.

If the category switch condition is satisfied (YES at S383), the simulation management unit 30 determines to perform the category switch (category switch=1) (S384) and ends the process. Furthermore, if a category, such as a co-occurring purchasing behavioral objective, that is to be switched is present, the simulation management unit 30 determines that the category switch is present (category switch=1) and returns the value indicating the category to be switched.

If the category switch condition is not satisfied (NO at S383), the simulation management unit 30 determines that the category switch is not performed (category switch=0) (S385) and ends the process.

A description will be given here by referring back to FIG. 5. Regarding each of the pedestrian agents A0, based on the recognition information I updated at S5 and based on the intention decided at S6, the pedestrian behavior execution unit 50 simulates a walking behavior of each of the pedestrian agents A0 (S7). Specifically, the pedestrian behavior execution unit 50 calculates, in accordance with the recognition information I recognized by each of the pedestrian agents A0 and the decided intention, the direction and an amount of walking in the step. Consequently, regarding each of the pedestrian agents A0, a facility search behavior of moving around the facility in accordance with the purchasing behavioral objective or the like is reproduces. The simulation result obtained at S7 is output to the simulation management unit 30 and is stored in the agent information storage unit 70.

Furthermore, if the recognition information I recognized by each of the pedestrian agents A0 is limited or if the target area is not determined, neighboring Waypoint is randomly selected and the walking destination of the selected Waypoint (direction and amount of walking) is calculated. Consequently, it is possible to reproduce the behavior that is a realistic someone's movement, such as "hanging around" or "getting lost", who lost the relationship between the destination and the own location.

Then, based on the simulation result stored in the agent information storage unit 70, the simulation result output unit 60 depicts the virtual space P and each of the pedestrian agents A0 in the virtual space P on the screen of the display device (S8).

For example, the simulation result output unit 60 depicts, based on the simulation result calculated for each step, the current location and the walked path each of the pedestrian agents A0 in the virtual space P. At this time, the simulation result output unit 60 may also change the display mode (for example, a color) in accordance with the state of the pedestrian agent A0, such as during strolling, during waiting, during searching, and the like. Furthermore, the simulation result output unit 60 may also depict the state of each of the facilities P2 (the number of attracted persons or the number of waiting persons) based on the simulation result calculated for each step. Consequently, a user can easily recognize the movement of each of the pedestrian agents A0 for each step.

Then, the simulation management unit 30 determines whether the process has been ended up to the previously set final step (time at which the simulation is to be ended) (S9). If the process is not ended (NO at S9), the simulation management unit 30 increments the number of steps (S10) and returns the process to S4.

If the process has been ended (YES at S9), the simulation result output unit 60 outputs the accumulation result of the simulation result of the agent information storage unit 70 to the screen of, for example, a display device (S11). Consequently, the user can easily recognize the accumulation result of the simulation.

Figure 14:
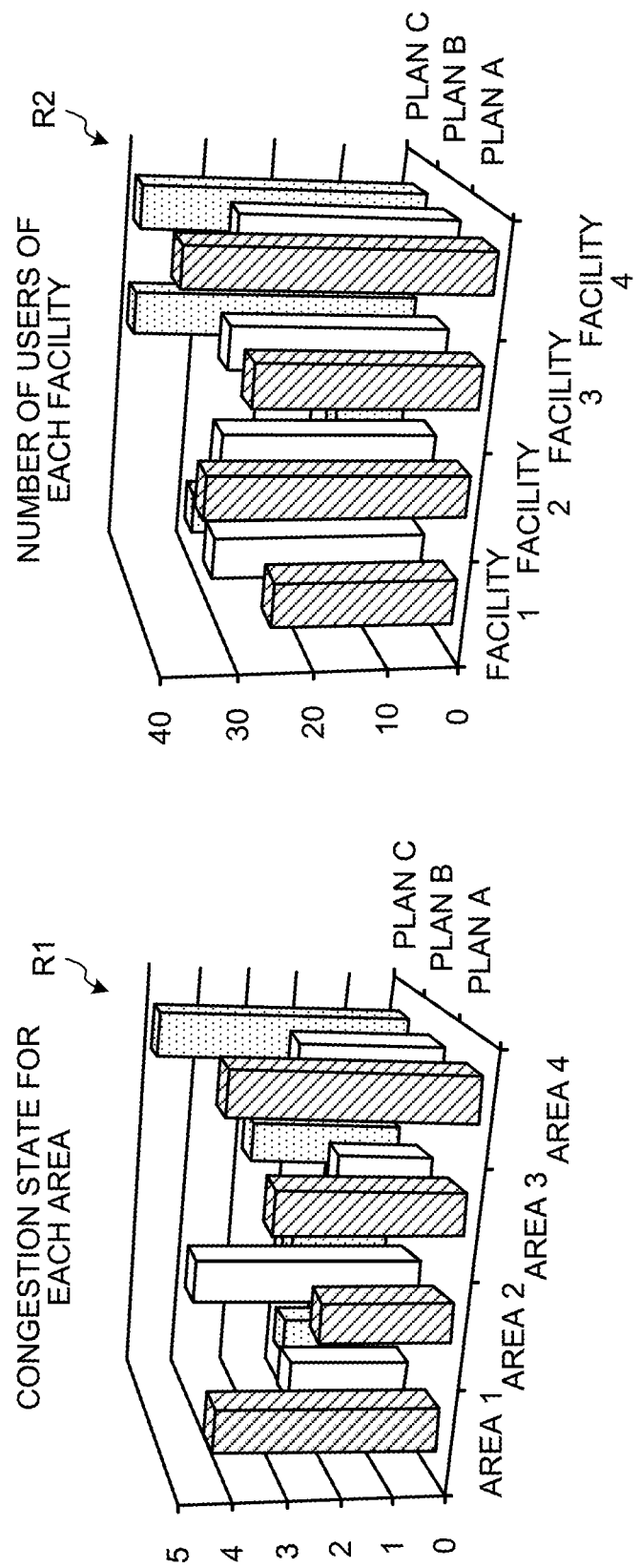
FIG. 14 is a diagram illustrating an output example of a simulation result.

FIG. 14 is a diagram illustrating an output example of a simulation result. As illustrated in FIG. 14, the simulation result output unit 60 accumulate the simulation results R1 and R2 obtained from the simulation performed each of measures and policies (plans A, B, and C) by appropriately arranging the sign system, the facilities, or the like and outputs the results to the screen of the display device. For example, regarding the measures and policies (plans A, B, and C), a simulation result R1 indicating a congestion state for each area (the number of users of each facility, waiting time, moving time, the number of facilities used by each of the pedestrian agents A0, etc.) by a bar graph may also be output. Furthermore, regarding the measures and policies (plans A, B, and C), a simulation result R2 indicating the number of users of each of the facilities by a bar graph may also be output.

Figure 15:
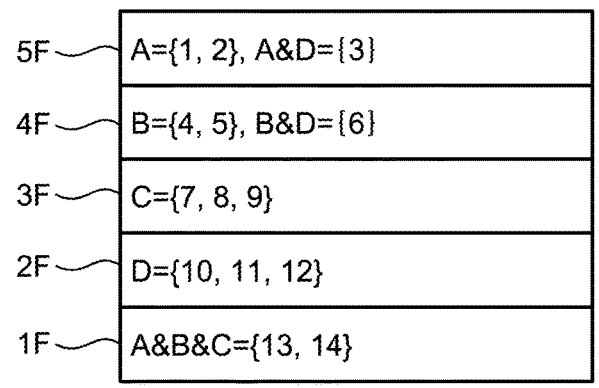
FIG. 15 is a diagram illustrating arrangement of facilities on each floor.

In the following, a behavior of the pedestrian agent A0 occurring due to a category switch during the simulation will be specifically described. FIG. 15 is a diagram illustrating arrangement of facilities on each floor.

As illustrated in FIG. 15, it is assumed that, on a first floor 1F, regarding categories A, B, and C associated with the purchasing behavioral objectives, the facilities {13, 14} that satisfy all (A&B&C) are present. Furthermore, on a second floor 2F, it is assumed that the facilities {10, 11, 12} related to a category D associated with the purchasing behavioral objectives are present. Furthermore, it is assumed that, on a third floor 3F, facilities {7, 8, 9} related to the category C associated with the purchasing behavioral objectives are present. Furthermore, it is assumed that, on a fourth floor 4F, the facilities {4, 5} related to the category B associated with the purchasing behavioral objective and the facility {6} that satisfies both the categories B and C (B&D) is present. Furthermore, it is assumed that, on a fifth floor 5F, the facilities {1, 2} related to the category A associated with the purchasing behavioral objective and the facility {3} that satisfies both the categories A and D (A&D) are present.

Furthermore, it is assumed that the recall category set of the pedestrian agent A0 related to the simulation is (A={1, 2,3,13,14}, B={4,5,6,13,14}, C={7,8,9}, D={3,6,10,11, 12}).

At the time of the start of simulation, the category A is selected from the recall category set based on, for example, the priority order (A, B, C, and D). The facility is selected based on a utility function (distance, congestion, etc.) in the order of, for example, 1→2→3→13→14.

Here, there may be a case in which the pedestrian agent A0 moved around the facilities in the order of 1→2→3 co-occurs with, in the facility {3} of (A&D), the category D at the switch probability and the purchasing behavioral objective (category) is changed.

Here, the pedestrian agent A0 shifted to the category D moves around the facilities in the order of 10→11→12→6 based on the utility function and determines that the target has been achieved (product purchase) in, for example, the category D in the facility {6}.

Then, the pedestrian agent A0 switches the purchasing behavioral objective to the category B, moves around the facilities in the order of 4→5→13→14 based on the utility function and determines that the target has been achieved (simultaneous product purchases of A and B) in, for example, the categories A and B in the facility {14}.

Then, the pedestrian agent A0 switches the purchasing behavioral objective to the remaining category C, moves around the facilities in the order of 7→8→9 based on the utility function and determines that the target has been achieved (product purchase), in practice, in for example, the category C in the facility {8}.

In this way, in the simulation apparatus 1, by performing a category switch during a simulation, regarding the pedestrian agent A0, it is possible to reproduce the behavior of the pedestrian, such as a case of searching the facility based on another purchasing behavioral objective that is different from the initial purchasing behavioral objective.

As described above, the input unit 10 in the simulation apparatus 1 provides, based on the input information (the space information 11, the sign system plan 12, and the pedestrian information 13) received from a user, regarding each of a plurality of pedestrian agents that performs a simulation in the simulation management unit 30, a plurality of purchasing behavioral objectives, an initial purchasing behavioral objective, and a plurality of facilities in which the plurality of purchasing behavioral objectives can be implemented. The simulation management unit 30 in the simulation apparatus 1 changes, regarding each of the plurality of pedestrian agents, the purchasing behavioral objective of each of the pedestrian agents based on the condition that has been set in accordance with a facility search behavior with respect to a facility that is selected in response to the purchasing behavioral objective of each of the pedestrian agents at the time of execution of the simulation. Consequently, in the simulation apparatus 1, it is possible to reproduce, with high accuracy, a humane behavior in which, for example, a purchasing behavioral objective is changed during the behavior of the pedestrian agent. Thus, in the simulation apparatus 1, it is possible to perform a people flow simulation with high accuracy including the behavioral process of the pedestrian agent.

Furthermore, if a behavior having an unchanged purchasing behavioral objective in each of the pedestrian agents at the time of the simulation is continued, the simulation management unit 30 changes the purchasing behavioral objective. Consequently, in the simulation apparatus 1, it is possible to reproduce the behavior of the pedestrian occurring in a case where, for example, the pedestrian loses interest in searching for the facility based on the same purchasing behavioral objective due to a behavior that is continued without changing the purchasing behavioral objective and then searches for the facility based on another purchasing behavioral objective.

Furthermore, regarding each of the pedestrian agents at the time of the simulation, if the number of facilities visited based on a predetermined and unchanged purchasing behavioral objective reaches a predetermined number, the simulation management unit 30 determines that the behavior of the unchanged purchasing behavioral objective has been continued. Consequently, in the simulation apparatus 1, it is possible to reproduce, with high accuracy, a state of a pedestrian occurring in a case where the pedestrian loses interest due to walking around several facilities based on the same purchasing behavioral objective.

Furthermore, in accordance with a behavior of each of the pedestrian agents at the time of simulation, if a purchasing behavioral objective co-occurring from the current purchasing behavioral objective of the pedestrian agent is present, the simulation management unit 30 changes to the co-occurring purchasing behavioral objective. Consequently, in the simulation apparatus 1, it is possible to reproduce, with high accuracy, a behavior of a pedestrian occurring in a case where the pedestrian notices from a predetermined purchasing behavioral objective to another purchasing behavioral objective and then changes the purchasing behavioral objective.

All or any part of various processing functions performed by the simulation apparatus 1 may also be executed by a CPU (or a microcomputer, such as an MPU, a micro controller unit (MCU), or the like). Furthermore, all or any part of various processing functions may also be, of course, executed by programs analyzed and executed by the CPU (or the microcomputer, such as the MPU or the MCU), or executed by hardware by wired logic. Furthermore, various processing functions performed by the simulation apparatus 1 may also be performed by a plurality of computers in cooperation with each other.

Figure 16:
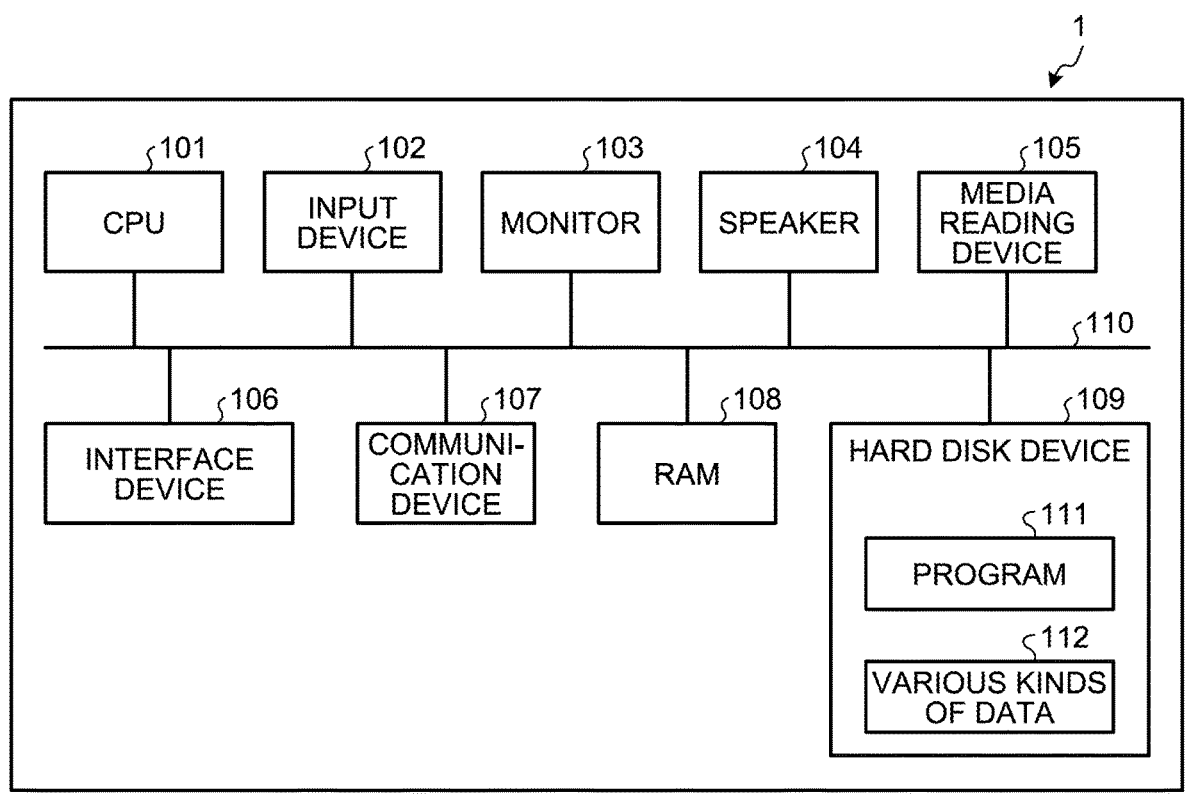
FIG. 16 is a block diagram illustrating an example of a hardware configuration of the simulation apparatus according to the embodiment.

The various processes described in the above embodiment can be implemented by programs prepared in advance and executed by a computer. Accordingly, in the following, an example of a computer (hardware) that executes programs having the same function as that described in the embodiments described above will be described. FIG. 16 is a block diagram illustrating an example of a hardware configuration of the simulation apparatus 1 according to the embodiment.

As illustrated in FIG. 16, the simulation apparatus 1 includes a CPU 101 that executes various kinds of arithmetic processing, an input device 102 that receives an input of data, a monitor 103, and a speaker 104. Furthermore, the simulation apparatus 1 includes a media reading device 105 that reads programs or the like from a storage medium, an interface device 106 that is used to connect various devices, and a communication device 107 that connected to an external apparatus for communication in a wired or wireless manner. Furthermore, the simulation apparatus 1 includes a RAM 108 that temporarily stores therein various kinds of information and a hard disk device 109. Furthermore, each of the units (101 to 109) in the simulation apparatus 1 is connected to a bus 110.

The hard disk device 109 stores therein a program 111 for executing various processes described above in the embodiment. Furthermore, the hard disk device 109 stores therein various kinds of data 112 referred to by the program 111. The input device 102 receives an input of operation information received from, for example, an operator of the simulation apparatus 1. The monitor 103 displays, for example, various screens operated by the operator. For example, a printer or the like is connected to the interface device 106. The communication device 107 is connected to a communication network, such as a local area network (LAN) and sends and receives various kinds of information to and from the external apparatus via the communication network.

The CPU 101 reads the program 111 stored in the hard disk device 109 and loads and executes the program 111 in the RAM 108, thereby executing various processes related to the input unit 10, the input information storage unit 20, the simulation management unit 30, the sign system/space changing unit 40, the pedestrian behavior execution unit 50, the simulation result output unit 60, and the agent information storage unit 70. Furthermore, the program 111 does not always need to be stored in the hard disk device 109. For example, the simulation apparatus 1 may also read and execute the program 111 stored in a storage medium that can be read by the simulation apparatus 1. Example of the storage medium that can be read by the simulation apparatus 1 include a portable recording medium, such as a CD-ROM, a DVD disk, a universal serial bus (USB) memory, or the like, a semiconductor memory, such as a flash memory or the like, and a hard disk drive. Furthermore, the program 111 may also be stored in a device connected to a public circuit, the Internet, a LAN, or the like and the simulation apparatus 1 may also read and execute the program 111.

According to an aspect of an embodiment of the present invention, it is possible to perform a people flow simulation with high accuracy.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process of simulating purchasing behaviors of persons by using a plurality of agents, the process comprising:
    setting, to an agent included in the plurality of agents, a plurality of purchasing behavioral objectives, and a first purchasing behavioral objective included in the plurality of purchasing behavioral objectives, and setting, to a purchasing behavioral objective included in the plurality of purchasing behavioral objectives, a plurality of facilities where the agent fulfills the purchasing behavioral objective;
    selecting for the agent a facility from among the plurality of facilities set to the first purchasing behavioral objective, when the agent acquires information of facilities;
    simulating a behavior of the agent searching for the selected facility;
    changing for the agent the first purchasing behavioral objective to a second purchasing behavioral objective included in the plurality of purchasing behavioral objectives based on a facility visited by the agent during the simulating.

2. The non-transitory computer-readable recording medium according to claim 1, wherein the changing includes changing the first purchasing behavioral objective to the second behavioral objective, when the agent continues a behavior of searching for a facility included in the plurality of facilities set to the first purchasing behavioral objective.

3. The non-transitory computer-readable recording medium according to claim 2, wherein the changing includes determining that the agent continues the behavior of searching, when the number of facilities included in the plurality of facilities set to the first purchasing behavioral objective visited by the agent reaches a predetermined number.

4. The non-transitory computer-readable recording medium according to claim 1, wherein the changing includes changing the first purchasing behavioral objective to the second purchasing behavioral objective, when a facility set to the first purchasing behavioral objective visited by the agent is included in the second purchasing behavioral objective.

5. A simulation method comprising:
setting, to an agent included in the plurality of agents, a plurality of purchasing behavioral objectives, and a first purchasing behavioral objective included in the plurality of purchasing behavioral objectives, and setting, to a purchasing behavioral objective included in the plurality of purchasing behavioral objectives, a plurality of facilities where the agent fulfills the purchasing behavioral objective, by a processor;
selecting for the agent a facility from among the plurality of facilities set to the first purchasing behavioral objective, when the agent acquires information of facilities;
simulating a behavior of the agent searching for the selected facility;
changing for the agent the first purchasing behavioral objective to a second purchasing behavioral objective included in the plurality of purchasing behavioral objectives based on a facility visited by the agent during the simulating, by the processor.

6. The simulation method according to claim 5, wherein the changing includes changing the first purchasing behavioral objective to the second behavioral objective, when the agent continues a behavior of searching for a facility included in the plurality of facilities set to the first purchasing behavioral objective.

7. The simulation method according to claim 6, wherein the changing includes determining that the agent continues the behavior of searching, when the number of facilities included in the plurality of facilities set to the first purchasing behavioral objective visited by the agent reaches a predetermined number.

8. The simulation method according to claim 5, wherein the changing includes changing the first purchasing behavioral objective to the second purchasing behavioral objective, when a facility set to the first purchasing behavioral objective visited by the agent is included in the second purchasing behavioral objective.

9. A simulation apparatus comprising a processor that executes a process of simulating purchasing behaviors of persons by using a plurality of agents, the process comprising:
setting, to an agent included in the plurality of agents, a plurality of purchasing behavioral objectives, and a first purchasing behavioral objective included in the plurality of purchasing behavioral objectives, and setting, to a purchasing behavioral objective included in the plurality of purchasing behavioral objectives, a plurality of facilities where the agent fulfills the purchasing behavioral objective;
selecting for the agent a facility from among the plurality of facilities set to the first purchasing behavioral objective, when the agent acquires information of facilities;
simulating a behavior of the agent searching for the selected facility;
chancing for the agent the first purchasing behavioral objective to a second purchasing behavioral objective included in the plurality of purchasing behavioral objectives based on a facility visited by the agent during the simulating.

10. The simulation apparatus according to claim 9, wherein the changing includes changing the first purchasing behavioral objective to the second behavioral objective, when the agent continues a behavior of searching for a facility included in the plurality of facilities set to the first purchasing behavioral objective.

11. The simulation apparatus according to claim 10, wherein the changing includes determining that the agent continues the behavior of searching, when the number of facilities included in the plurality of facilities set to the first purchasing behavioral objective visited by the agent reaches a predetermined number.

12. The simulation apparatus according to claim 9, wherein the changing includes changing the first purchasing behavioral objective to the second purchasing behavioral objective, when a facility set to the first purchasing behavioral objective visited by the agent is included in the second purchasing behavioral objective.

* * * * *